June 3, 1941. E. W. RICKMEYER 2,244,349
SWITCH
Filed March 28, 1939 2 Sheets-Sheet 2
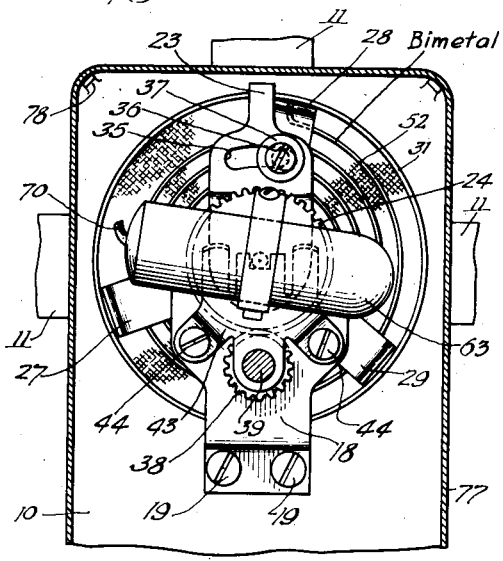
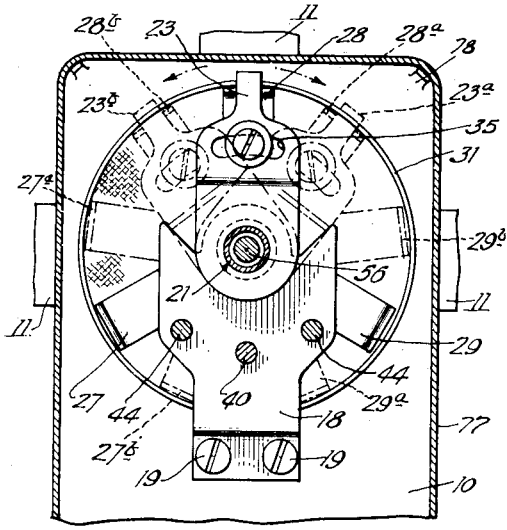
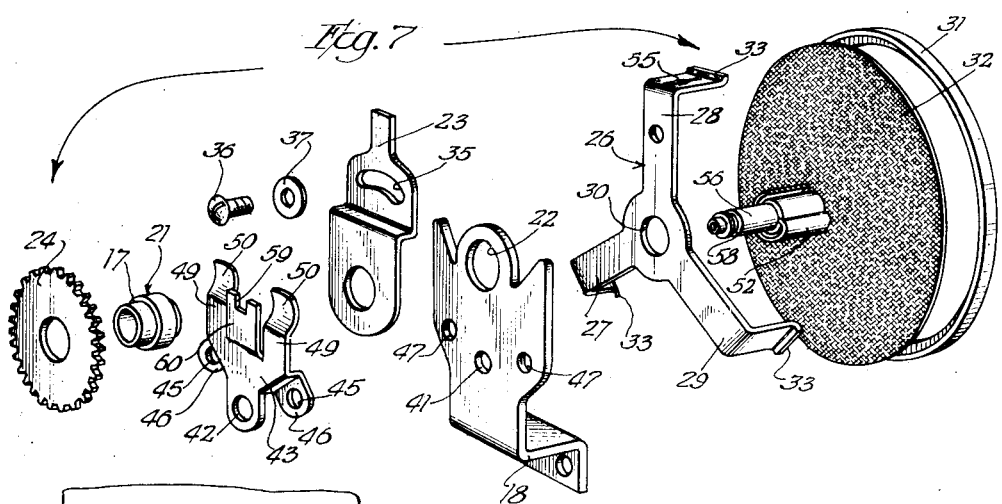
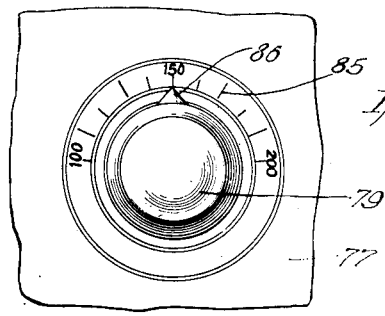
Inventor:
Ernst Walter Rickmeyer
By
Atty.

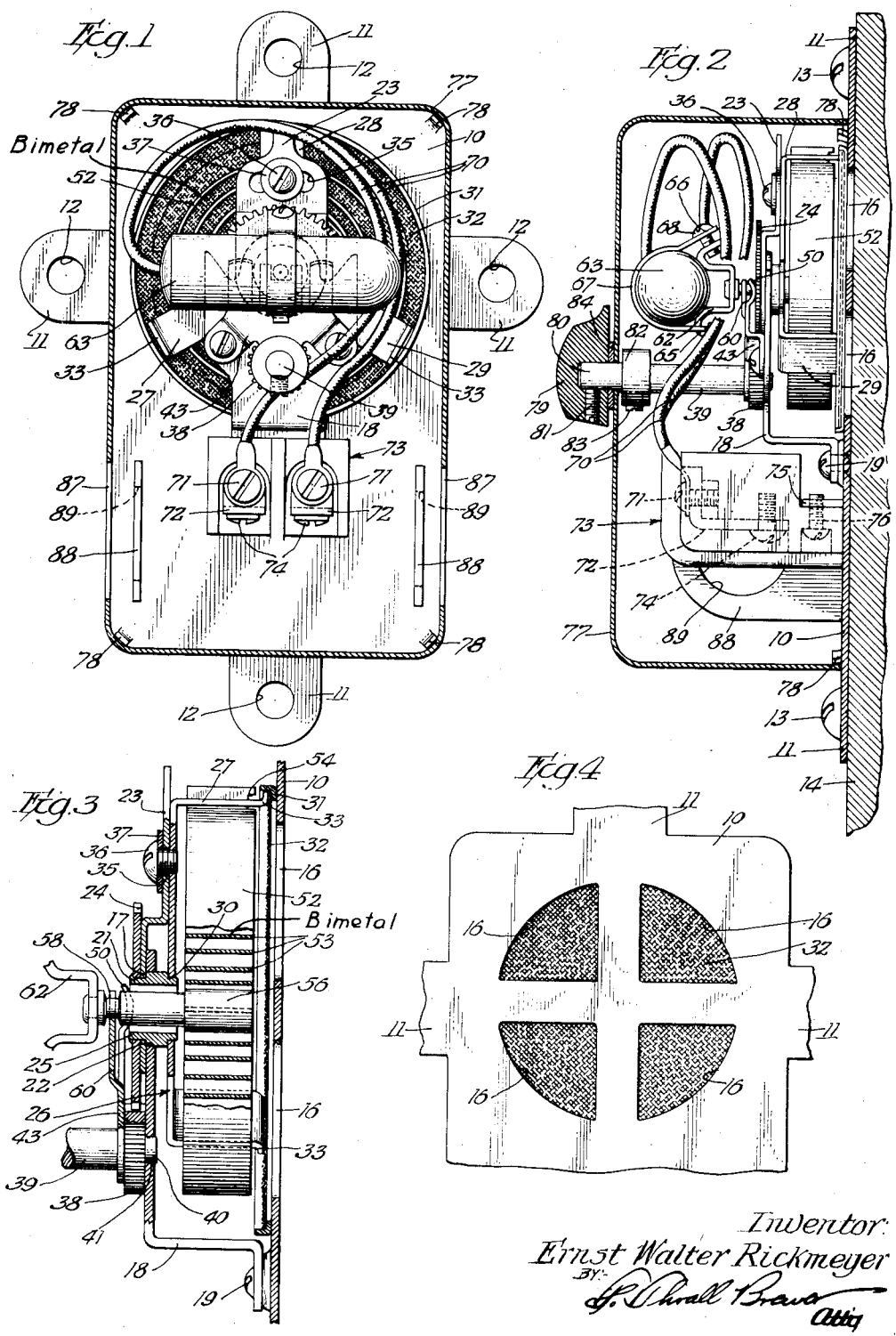

Patented June 3, 1941

2,244,349

UNITED STATES PATENT OFFICE 2,244,349

SWITCH

Ernst Walter Rickmeyer, Elmhurst, Ill., assignor to Jefferson Electric Company, Bellwood, Ill., a corporation of Illinois Application March 28, 1939, Serial No. 264,610

6 Claims. (Cl. 200—139)

This invention relates to switches and more particularly to adjustable automatic switches.

It is an object of my invention to provide an automatic temperature responsive switch that is adjustable to vary the temperature differential between the circuit making and breaking operations thereof, as well as to vary the temperatures at which the switch is responsive to make or break a circuit.

Another object of my invention is to provide a temperature responsive switch mechanism for actuating a mercury switch unit and having a plurality of adjustments for controlling the operation of the switch.

Another object of my invention is to provide a temperature responsive switch which is easily manufactured and assembled and which is adapted to be mounted adjacent a surface, such as that of a boiler or water tank, for operation responsive to the temperature of the surface.

Other objects and advantages of my invention will be apparent from the following description wherein reference is made to the accompanying drawings and a preferred embodiment of my invention is clearly described and illustrated.

In the drawings,

Figs. 1 and 2 are, respectively, front and side elevations of a switch embodying a preferred form of my invention and each have parts thereof shown in section;

Fig. 3 is a fragmentary view having parts cut away and parts shown in section to emphasize certain details of a part of this switch shown in Figs. 1 and 2;

Fig. 4 is a fragmentary view of a part of the switch shown in Figs. 1 and 2;

Figs. 5 and 6 are fragmentary front elevational views of the switch shown in Figs. 1 and 2 having parts shown in section;

Fig. 7 is an exploded view of a part of the switch shown in Figs. 1 and 2; and

Fig. 8 is a fragmentary front view of a portion of the switch shown in Figs. 1 and 2.

Having particular reference to the drawings, the preferred embodiment of my switch has a base 10 which provides a main support for the operating parts of the switch. The base 10 has a plurality of ears or lugs 11 that are preferably integrally formed on the sides thereof and have openings 12 therein for accommodating screws or suitable fastening means 13 which secure the switch to a support or surface such as 14. This switch is particularly adapted to be mounted directly against the support or surface 14 and the base has a plurality of openings such as 16 therein which improve the transfer of heat from the support or mounting surface 14 to the operating parts of the switch.

A bracket 18 is secured to the base 10 by screws such as 19 or other suitable fastening means. A hollow stud 21 is rotatably mounted in an opening 22 in the bracket 18. An adjusting arm 23 and a gear 24 are secured to one end of the hollow stud 21 by milling or riveting the end of the stud as at 25. The adjusting arm 23 is adjacent the bracket 18 and engages a shoulder 17 on the stud, while the gear 24 is adjacent the adjusting arm 23. A spider 26 having angularly disposed arms 27, 28, and 29, and a substantially central opening 30, is rotatably mounted on the end of the stud 21 opposite the adjusting arm 23 and gear 24. A flanged ring 31 surrounds the openings 16 in the base 10 and supports a screen 32 that is preferably made of fine wire mesh; the ring being held in position against the base, and the screen being held in position with respect to the ring by feet 33 on the ends of the arms 27, 28, and 29 of the spider 26. The ring 31 is preferably slidable on the base 10 and the feet 33 preferably engage the screen 32 so that rotary movement of the spider 26 moves the ring 31 with respect to the base without disturbing the position of the screen 32 with respect to the ring 31. This feature prevents wear on and warping of the screen 32. The adjusting arm 23 has an arcuate slot 35 therein and is secured in a fixed angular position, within the limits of movement permitted by the slot 35, by a screw 36 that is threaded into the arm 28 of the spider 26. A washer 37 is preferably provided between the head of the screw 36 and the adjusting arm 23.

A pinion gear 38 meshes with the gear 24 and is secured to a shaft 39. An end 40 of the shaft 39 is rotatably mounted in an opening 41 in the bracket 18 and the shaft extends through an opening 42 in a friction yoke 43. The friction yoke 43 is secured to the bracket 18 by screws or other suitable fastening means 44 which extend through openings 45 in lugs 46 on the sides of the friction yoke and are threaded into openings 47 in the bracket 18. The friction yoke 43 has extending fingers 49 that are preferably resilient and have curved end portions 50 that engage the gear 24 to prevent axial movement of the stud 21 and to hold the stud 21 in position with the adjusting arm 23 adjacent and resting against the bracket 18. With this particular construction, it will be understood that when the adjusting arm 23 is secured to the spider 26 by tightening the screw 36, the spider 26, ring 31, and screen 32 are rotated with respect to the base 10 by manual rotation of the shaft 39. It will also be understood that since the spider 26 is rotatably mounted on the stud 21 and is slidable thereon, the sub-assembly comprising the stud 21, gear 24, and adjusting arm 23, as well as the sub-assembly comprising the pinion gear 38 and shaft 39, are held in assembled position by the friction yoke 43 and screws 45.

A temperature responsive element 52 which preferably comprises a spirally wound strip of bi-metal having spaced turns such as 53, has one end anchored to the arm 28 of the spider 26; the outer end of the bi-metallic strip being notched at 54 and engaging a slot 55 in the arm 27. The inner end of the bi-metallic strip or temperature responsive element 52 is secured to a shaft 56. The shaft 56 extends through the hollow stud 21 and is preferably spaced therefrom and substantially concentric therewith. This shaft 56 has a groove or portion of reduced section at 58 that rests in a slot 59 in a projecting portion 60 of the friction yoke 43. To prevent binding and friction the slot 59 is preferably wider than the portion 58 of the shaft, and the axial length of the portion 58 of the shaft is preferably longer than the thickness of the projecting portion 60 of the friction yoke. This provides an anti-friction bearing support for the shaft 56 and permits some angular and transverse movement of the shaft to prevent binding due to any distortion or other movement of the temperature responsive element 52 in a direction transverse to the axis of the shaft 56. Normal flexure of the bi-metallic strip effects a rotary movement of the shaft.

A switch support bracket 62 is secured to the end of the shaft 56 oppoiste the temperature responsive element 52 to provide a support for a switching element which is preferably a mercury switch such as 63, which mercury switch controls an electrical circuit by movement of a quantity of mercury within the mercury switch housing. The movement of the quantity of mercury is, of course, dependent upon the angular position of the mercury switch.

The switch support bracket 62 has a hook 65 on one end thereof and an angularly disposed lug 66 on the other end thereof. A strip 67 is secured at one end by the hook 65 and at the other end by a screw 68 that extends through the strip and is threaded into the lug 66. The strip 67 clamps the mercury switch 63 in place against the support bracket 62. The normal angular position of the mercury switch 63 with respect to the shaft 56 and the temperature responsive element 52 is predetermined when the support bracket 62 is secured to the shaft. Manual adjustment of the shaft 39 when the screw 36 is tightened to maintain a fixed angular position between the adjusting arm 23 and the arm 28 of the spider 26, effects movement of the arm 28 and adjusting arm 23 to positions such as those indicated at 23a, 28a, and 23b, 28b, respectively. At the same time the arms 27 and 29 move to positions indicated at 27a, 27b, and 29a, 29b, respectively. Such movement of the arm 28 moves the anchored outer end of the temperature responsive element 52 and consequently rotates the temperature responsive element 52, shaft 56, and support bracket 62 to adjust the normal angular position of the mercury switch 63. This adjustment of the normal angular position of the mercury switch 63 controls the temperatures at which the mercury switch will operate to make or break the electrical circuit controlled thereby. In other words, this adjustment determines the movement of the mercury switch 63 which must necessarily be effected by the temperature responsive element 52 in order to effect operation of the mercury switch. Adjustment of the position of the arm 28 with respect to the position of the adjusting arm 23 varies the temperature differential between the making and breaking of a circuit by the mercury switch 63. Figs. 5 and 6 illustrate different adjusted positions of the arm 28 with respect to the adjusting arm 23. In addition to adjusting the temperature differential between the making and breaking of an electrical circuit, this adjustment also serves as an adjustment for determining the position of the shaft 56 which corresponds to a certain position of the shaft 39. Since the mercury within the mercury switch 63 has a mass which acts through the mercury switch housing as a lever arm, the adjustment of the position of the arm 28 with respect to the arm 23 varies the component of force against which the temperature responsive element 52 must act to effect operation of the mercury switch. This factor controls the variation in temperature differential between making and breaking of the circuit by the mercury switch which may be obtained by adjustment of the arm 28 with respect to the adjusting arm 23.

Electrical connections are made to the mercury switch 63 by lead wires such as 70, which are preferably flexible and which are long enough to permit full movement of the mercury switch in response to movements of the temperature responsive element 52. The lead wires 70 are preferably anchored by screws, such as 71, to terminal strips 72 on an insulating terminal block 73. The terminals 72 are secured to the terminal block 73 by screws such as 74, which screws also serve to anchor lead wires that extend from the switch to the circuit controlled thereby. The terminal block 73 is secured to an integral bracket 75 on the base 10 by screws such as 76.

The switch operating mechanism is preferably covered by a housing 77 that is located with respect to the base 10 by lugs, such as 78, that are preferably integral with the base 10 and engage the inner edges of the housing. The housing 77 is held against the base 10 by a knob 79 that is secured to a shaft extension 80 by a set screw 81; the shaft extension 80 having an integral collar 82 that is secured to the shaft 39 by a set screw 83. A washer, such as 84, is preferably interposed between the knob 79 and the housing 77 to hold the housing in position and space the knob 79 therefrom. As indicated in Fig. 8, the housing 77 preferably has a graduated scale such as 85 secured thereto or engraved thereon, adjacent a pointer 86 on the knob 79. The scale 85 and pointer 86 indicate the adjustment of the normal position of the mercury switch 63 when the housing is in place. The housing 77 preferably has openings 87 in the sides thereof through which suitable conduit extends into the housing for enclosing the wires that connect the switch to an external circuit. Also, brackets such as 88 are preferably secured to the base 10, which brackets have openings such as 89 therein. These brackets 88 serve as anchors for the conduit.

While I have described a preferred embodiment of my invention, many modifications may be made therein without departing from the spirit of the invention, and I do not wish to be limited to the precise details of construction set forth, but desire to avail myself of all changes within the scope of the appended claims.

What I claim as new and desire to cover by Letters Patent is:

1. A switch comprising, in combination, a base having a vent opening therein, a bracket secured to the base and having an opening therein, a tubular stud rotatably mounted in said opening in the bracket, an adjusting plate secured to the stud and rotatable therewith, a ring adjacent and slidable with respect to the base, a screen supported by the ring and covering said vent opening in the base, a spider rotatably mounted on said stud and having a plurality of feet engaging the screen to hold the screen and ring against the base, means securing the adjusting plate in an adjusted angular position with respect to the spider, a friction yoke secured to the bracket for holding the stud in place, a spirally wound bi-metallic temperature responsive element having one end supported by the spider, a shaft extending through said tubular stud and secured to the other end of the temperature responsive element, bearing means supporting the shaft for movement responsive to flexure of the temperature responsive element, and switch means actuated by the shaft.

2. A switch comprising, in combination, a base having a vent opening therein, a bracket secured to the base and having an opening therein, a tubular stud rotatably mounted in said opening in the bracket, an adjusting plate secured to the stud and rotatable therewith, a ring adjacent and slidable with respect to the base, a screen supported by the ring and covering said vent opening in the base, a spider rotatably mounted on said stud and having a plurality of feet engaging the screen to hold the screen and ring against the base, means securing the adjusting plate in an adjusted angular position with respect to the spider, a friction yoke secured to the bracket for holding the stud in place, a spirally wound bi-metallic temperature responsive element having one end supported by the spider, a shaft extending through said tubular stud and secured to the other end of the temperature responsive element, bearing means supporting the shaft for movement responsive to flexure of the temperature responsive element, said bearing means comprehending a slot in the friction yoke and a portion of reduced section in the shaft with said portion of reduced section loosely supported in said slot, and switch means actuated by the shaft.

3. A switch comprising, in combination, a base having a vent opening therein, a bracket secured to the base and having an opening therein, a tubular stud rotatably mounted in said opening in the bracket, a gear secured to the stud, a ring adjacent and movable with respect to the base, a screen supported by the ring and covering said vent opening in the base, a spider mounted on the stud and having a plurality of feet engaging the screen to hold the screen and ring adjacent the opening in the base, means connecting said gear to said spider, a manually operable pinion gear rotatably mounted on the bracket in meshing relation with the first mentioned gear, a friction yoke secured to the bracket for holding the gears in place, a temperature responsive element having one end supported by the spider, a shaft extending through the tubular stud and secured to the other end of the temperature responsive element, means providing a single anti-friction bearing for supporting the shaft for movement responsive to the temperature responsive element, and switch means actuated by the shaft.

4. A switch comprising, in combination, a tubular stud, an adjusting plate secured to the stud, an arm rotatably mounted on the stud, a bi-metallic element supported at one end by the arm, a shaft secured to the other end of the bi-metallic element and extending through the tubular stud, means securing the adjusting plate in a fixed position with respect to the arm, means rotatably supporting the tubular stud, means providing an anti-friction support for the shaft, manually operable means for adjusting the position of the arm, and a mercury switch carried by the shaft.

5. In a switch, the combination comprising, a base having a vent opening therein, a bracket secured to the base and having an opening therein, a ring adjacent the base and slidable thereon, a screen supported by the ring and covering said vent opening in the base, a stud rotatably mounted in the opening in said bracket, and a spider mounted on said stud, said spider having feet engaging the screen to hold the screen and ring in place with respect to the base.

6. In a switch, the combination comprising, a base having a vent opening therein, a bracket secured to the base and having an opening therein, a ring adjacent the base and slidable thereon, a screen supported by the ring and covering said vent opening in the base, a stud rotatably mounted in the opening in said bracket, a spider rotatably mounted on said stud, a shaft, a temperature responsive element having one end anchored to the spider and the other end secured to the shaft, an arm secured to the stud, and means securing the arm in a fixed position with respect to the spider.

ERNST WALTER RICKMEYER.